United States Patent
Lee et al.

(10) Patent No.: US 8,134,579 B2
(45) Date of Patent: Mar. 13, 2012

(54) METHOD AND SYSTEM FOR MAGNIFYING AND DISPLAYING LOCAL IMAGE OF TOUCH DISPLAY DEVICE BY DETECTING APPROACHING OBJECT

(75) Inventors: Yu-Chieh Lee, Huatan Township, Changhua County (TW); Peng-Yueh Hsieh, Taipei (TW)

(73) Assignee: Getac Technology Corporation, Hsinchu (TW)

( * ) Notice: Subject to any disclaimer, the term of this patent is extended or adjusted under 35 U.S.C. 154(b) by 660 days.

(21) Appl. No.: 12/216,266

(22) Filed: Jul. 2, 2008

(65) Prior Publication Data

US 2009/0225100 A1 Sep. 10, 2009

(30) Foreign Application Priority Data

Mar. 10, 2008 (CN) .......................... 2008 1 0086032

(51) Int. Cl.
*G09G 5/00* (2006.01)
(52) U.S. Cl. ........ 345/661; 345/660; 345/533; 345/156; 345/158; 345/168; 345/173; 715/863
(58) Field of Classification Search .......... 345/156–173, 345/533; 715/863
See application file for complete search history.

(56) References Cited

U.S. PATENT DOCUMENTS

| | | | |
|---|---|---|---|
| 2004/0196267 A1* | 10/2004 | Kawai et al. | 345/173 |
| 2004/0212586 A1* | 10/2004 | Denny, III | 345/156 |
| 2005/0099400 A1* | 5/2005 | Lee | 345/173 |
| 2006/0022955 A1* | 2/2006 | Kennedy | 345/173 |
| 2006/0209016 A1* | 9/2006 | Fox et al. | 345/156 |
| 2007/0018991 A1* | 1/2007 | Hsu | 345/533 |
| 2008/0288895 A1* | 11/2008 | Hollemans et al. | 715/863 |
| 2009/0085878 A1* | 4/2009 | Heubel et al. | 345/173 |
| 2009/0207139 A1* | 8/2009 | Kraft | 345/173 |
| 2009/0327977 A1* | 12/2009 | Bachfischer et al. | 715/863 |

* cited by examiner

*Primary Examiner* — Jin-Cheng Wang

(57) ABSTRACT

Disclosed are a method and system for magnifying and displaying local image of a touch display device. When an object is detected to be approaching an effective touch zone on a touch surface of a touch panel, the distance or altitude between the approaching object at a position on the effective touch zone of the touch panel where the approaching object heads for and the touch surface of the touch panel is determined. When the distance is less than a first predefined approaching altitude, a target graphic representation associated with the position of the approaching object on the touch panel is first enlarged and then, based on a second predefined approaching altitude, an operation of magnification of the local area or the target graphic representation displayed on a display panel corresponding to the position of the approaching object or execution of an executable object linked to the graphic representation is carried out. The second predefined approaching altitude can be defined as being in contact with the touch surface of the touch panel.

21 Claims, 17 Drawing Sheets

TAB1

| Approaching Altitude | Operation |
|---|---|
| d1 — First Approaching Altitude | First Predefined Magnification — x1 |
| d2 — Second Approaching Altitude | Second Predefined Magnification — x2 |

FIG.2A

TAB2

| |  |
|---|---|
| Image Magnification Area Setting | W |
| Image Magnification Mode Setting | M |

FIG.2B

TAB1a

| Approaching Altitude | Operation | |
|---|---|---|
| d1 — First Approaching Altitude | First Predefined Magnification | — x1 |
| d2 — Second Approaching Altitude = 0 | Second Predefined Magnification | — x2 |

FIG.11

TAB1b

| Approaching Altitude | Operation |
|---|---|
| d1 — First Approaching Altitude | First Predefined Magnification — x1 |
| d2 — Second Approaching Altitude | Execution of Executable Object Associated with Target Graphic |

FIG.14

TAB1c

| Altitude | Operation | |
|---|---|---|
| d1 — First Approaching Altitude | First Predefined Magnification | — x1 |
| d2 — Second Approaching Altitude = 0 | Execution of Executable Object Associated with Target Graphic | — x2 |

FIG.16

METHOD AND SYSTEM FOR MAGNIFYING AND DISPLAYING LOCAL IMAGE OF TOUCH DISPLAY DEVICE BY DETECTING APPROACHING OBJECT

FIELD OF THE INVENTION

The present invention relates to the operation interface technology of touch display devices, and in particular to a method and system for magnifying and displaying local image of a touch display device.

Combination of a touch panel to a liquid crystal display device is commonly adapted in wide applications, including displays of portable notebook computers, input measures of portable personal mobile phones, all sorts of information appliances and household electrical appliances, public information system facility, and office automation machines.

A conventional touch panel is constructed with a glass substrate having a surface coated with a transparent conductive layer, such as an ITO conductive layer. Further, another transparent conductive layer is coated on a bottom surface of a film and is set in correspondence with the transparent conductive layer of the glass substrate. Insulation spacers are arranged between the transparent conductive layers of the glass substrate and the film to separate the transparent conductive layers from each other. When depressed or actuated, the touch panel generates a touch signal, which is transmitted to a controller through a signal transmission line. The conventional touch panel can be of various touch detection construction, including capacitive panel and surface acoustic wave panel.

SUMMARY OF THE INVENTION

For the state-of-art technology of liquid crystal display and touch panel, although it is possible to design and manufacture large-sized liquid crystal displays or liquid crystal displays with touch control function, due to the constraints imposed by the trends of being compact, small size and light weight for portable electronic devices, the touch display device used in the portable electronic device is often of small size. This causes problems for users to operate the touch display device, for the effective operation zone of the touch display device is small and the displayed image or texts are also small, leading to inconvenience and mistaken touch of the user.

For the currently prevailing operation software, the WINDOWS®, the images displayed on the display screen can be divided into system control items and icons or patterns or texts of executable application programs. In manipulating or handling the icons, patterns or texts displayed on a small-sized touch display device, the most common trouble that a user must encounter is difficult to touch or select the desired icons and/or patterns; and further, for texts of small sizes, the user has to completely concentrate oneself on the display screen in order to recognize the texts.

Such problems are very troublesome to regular users with normal eyesight in clearly identifying the small-sized characters or stably hitting the desired icons. And this is an even worse problem for users with poor eyesight.

Thus, an objective of the present invention is to provide a system for magnifying and display a local image of a touch display device that can selectively and locally enlarge a target graphic representation so as to ease identification of icons, patterns, and texts when a user is operating a touch display device.

Another objective of the present invention is to automatically provide a magnified image of a local area in accordance with the distance or altitude by which a user's finger or a touch stylus is approaching a touch surface of a touch panel, whereby the operation of the touch display device of a small-sized electronic device is simplified, hitting precision is improved, and identification of icons is made easy.

A further objective of the present invention is to provide a function of automatically hitting an executable icon by a user moving his or her finger or a touch stylus close to a predetermined altitude with respect a touch surface of a touch display device without any physical engagement with the touch surface.

The technique solution in accordance with the present invention is that a method and system for magnifying and displaying a local image of a touch display device by detecting an approaching object are provided, in which there is at least one predefined approaching altitude and a corresponding magnification ratio. When for example a user's finger tip or a touch stylus is approaching an effective touch zone defined on a touch surface of the touch panel, a microprocessor detects and determines that an approaching altitude at which the approaching object, namely the finger tip or the stylus, is approaching the touch surface of the touch panel is less than a predefined approaching altitude. Under such a condition, the microprocessor, taking the position on the touch surface where the approaching object is heading for as a reference point, and basing on the predefined approaching altitude and the corresponding magnification ratio, carries out magnification of a target graphic representation in a local area displayed on the display panel and associated with the position of the approaching object.

The target graphic representation may include icons of executable application programs, patterns, or texts. When the user's finger tip or the touch stylus is moved to an approaching altitude with respect to the touch surface of the touch panel that is small than the predefined approaching altitude, an automatic hitting operation is induced without physical engagement with the touch surface to directly execute the file linked to the target graphic representation. In a preferred embodiment of the present invention, at least one predefined image magnification mode setting and predefined image magnification area setting are further included.

The method provided by the present invention allows a user's need of operation to be detected and a local image associated with the selected operation zone is displayed to realize a more user-friendly visual interface. With the user's finger tip or touch stylus approaching the touch panel, the local image is dynamically enlarged or magnified with a proportional magnification ratio so that an improved and eased operation can be realized.

In applications of actual commercialization, the target graphic representation can be linked to icons of system control items that are illustrated in the currently prevailing operation system, the WINDOWS®, or icons of executable application programs, so that when an approaching object is moving toward and close to a related zone, an enlarged image of the icon is shown to allow a user to clearly identify and hit. The target graphic representation can be alternatively a local image or texts displayed on the touch display device, whereby when an approaching object is approaching the related zone, an enlarged image of the local image or the texts are demonstrated. In this way, a compact, small-sized, light-weighted portable electronic device does not need to equip with a large-sized display screen to provide clear visual identification and precise hitting operation.

Besides providing a convenient visual man-machine interface for users of normal eyesight, the present invention is also effective in protecting the users against tiredness of eyes caused by continuously watching small icons, small patterns, and small texts and excessive use of eyes, and is of practical value for users with poor eyesight.

Automatic hitting without direct and physical engagement with the touch panel effectively reduces the number of being touched for the touch panel and protects the touch panel. Controlling and operating the touch panel without direct and physical touch can certainly extend the lifespan of the touch panel.

BRIEF DESCRIPTION OF THE DRAWINGS

The present invention will be apparent to those skilled in the art by reading the following description of preferred embodiments thereof and the best mode for carrying out the present invention, with reference to the attached drawings, in which:

FIG. 2A shows a predefined approaching altitude vs operation table TAB1 adapted in the device of FIG. 1;

FIG. 2B shows an example of a predefined magnification mode setting TAB2 adapted in the device of FIG. 1;

FIG. 11 shows another example of the predefined approaching altitude vs operation table in accordance with the present invention;

FIG. 14 shows a further example of the predefined approaching altitude vs operation table in accordance with the present invention;

FIG. 16 shows yet a further example of the predefined approaching altitude vs operation table in accordance with the present invention.

DETAILED DESCRIPTION OF THE PREFERRED EMBODIMENTS

Figure 1:
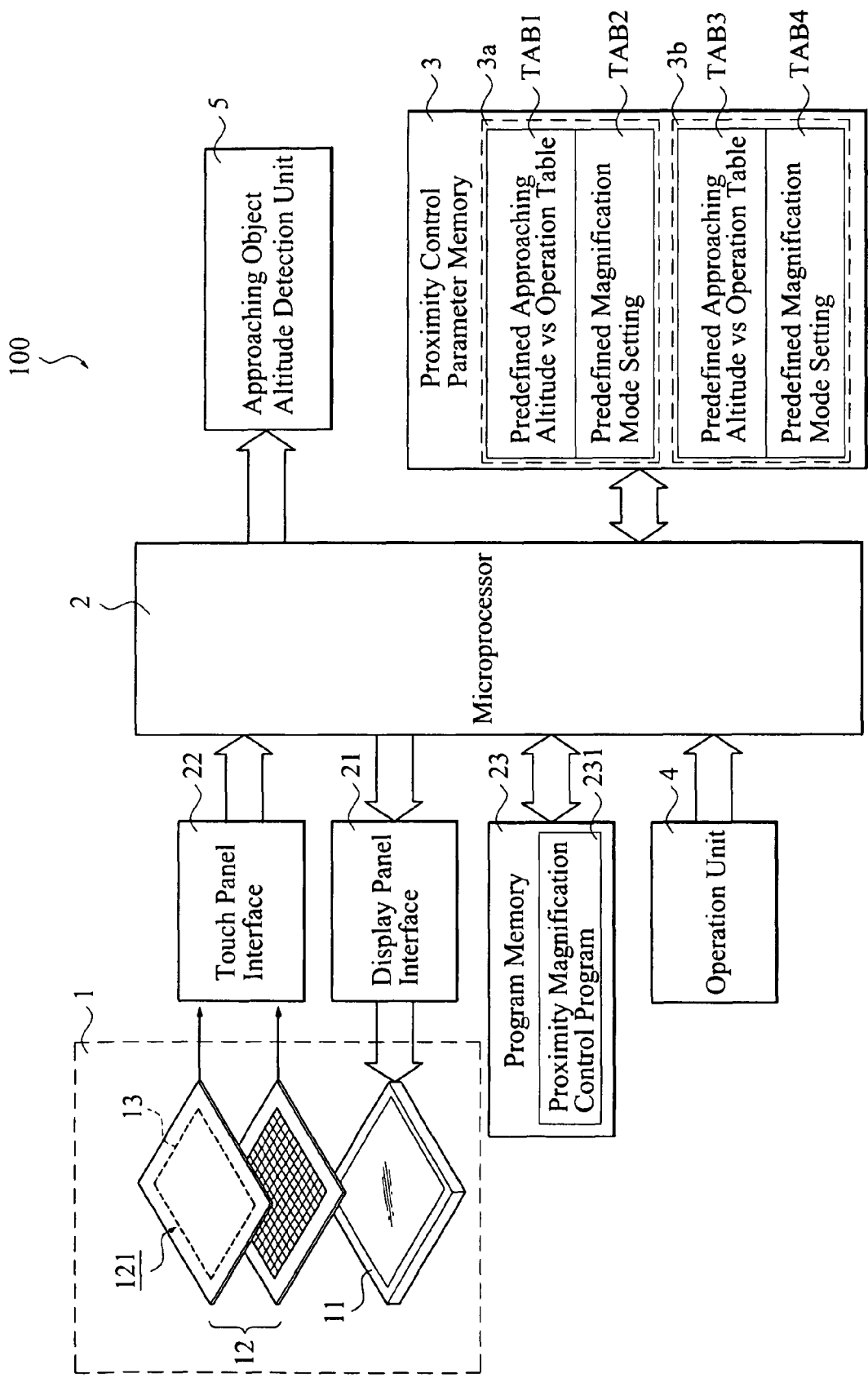
FIG. 1 illustrates a system block diagram of a touch display device comprising a system for magnifying and displaying local image by detecting approaching object in accordance with the present invention.

With reference to the drawings and in particular to FIG. 1, which illustrates a schematic system arrangement of a touch display device which comprises a system for magnifying and displaying local image by detecting approaching objecting in accordance with the present invention, the touch display device of the present invention, generally designated at 100, comprises a touch display panel module 1, which consists of a display panel 11 and a touch panel 12 integrated on the display panel 11. The touch panel 12 can be of for example a touch panel configured in accordance with resistive, capacitive, or surface acoustic wave technology. The touch panel 12 has a surface defining an effective touch zone 13 with which touch control/operation can be carried out by a user.

The touch display panel module 1 of the touch display device 100 of the present invention can be combined with a portable electronic device, such as a personal digital assistant (PDA), a touch-screen game device, a touch-screen computer, or can be of other forms integrated with touch-screen digital electronic facility.

A microprocessor 2 is connected to the display panel 11 and the touch panel 12 via a display panel interface 21 and a touch panel interface 22, respectively, to transmit an image to be displayed to the display panel 11 and to receive a user touch signal detected by the touch panel 12. The microprocessor 2 is selectively operated to execute a proximity magnification control program 231 to magnify and display a local image of the touch display device 100.

The microprocessor 2 is coupled to a program memory 23 and a proximity control parameter memory 3. The program memory 23 stores therein the proximity magnification control program 231 for magnifying and displaying the local image of the touch display device 100. The proximity control parameter memory 3 stores therein at least one set of factory-defined proximity control parameters 3a or a set of user-defined proximity control parameters 3b. The factory-defined proximity control parameters 3a consist of at least one predefined approaching altitude vs operation table TAB1 and at least one predefined magnification mode setting TAB2. The user-defined proximity control parameters 3b consist of at least one predefined approaching altitude vs operation table TAB3 and at least one predefined magnification mode setting TAB4.

An operation unit 4 is connected to the microprocessor 2 for users' operation and input of data for the predefined approaching altitude vs operation table TAB3 and the predefined magnification mode setting TAB4. In practical applications, the operation unit 4 can be eliminated and the touch input function realized with the touch display panel module 1 can be used instead to provide the functions that are to be realized by the operation unit 4.

An approaching object altitude detection unit 5 is connected to the microprocessor 2 for detecting an actual altitude "d" of the approaching object with respect to the surface of the touch panel 12 and transmitting the altitude "d" to the microprocessor 2.

FIG. 2A shows an example of the predefined approaching altitude vs operation table TAB1 of FIG. 1. In the example, the predefined approaching altitude vs operation table TAB1 contains a first predefined approaching altitude "d1" corresponding to a first predefined magnification "x1", such as magnifying a target graphic representation by two times, and a second predefined approaching altitude "d2" corresponding to a second predefined magnification "x2", such as magnifying a target graphic representation by three times. Besides magnified displaying of a target graphic representation, an operation that will be taken in relation with a predefined approaching altitude can be magnifying and displaying a local image or executing an object that the approaching object is approaching.

Based on practical needs, the approaching object altitude detection unit 5 can be designed to provide more and greater magnification ratios and/or having reduced difference between adjacent ones of the magnification ratios, or alternatively, dynamic magnification that effects increasing magnification ratio with the reduction of approaching distance. The target graphic representation can be a shortcut icon linked to an executable program or an image, such as a static image or a dynamic image, or a graphic representation of an executable control key or a graphic representation of a symbol, such as an alphabetic key, a numeric key or a symbol key. The graphic representation can alternatively be a local image and does not generate any control signal or an input of signal.

FIG. 2B shows that the predefined magnification mode setting TAB2 of FIG. 1 contains values of a predefined or user-defined image magnification mode setting "M", such as circle, rectangle, or other predefined contour shapes, and a predefined or user-defined image magnification area setting "W", such as a local image in a circular area that has a center at the position where an approaching object is located and a radius of 1 centimeter.

Further, the image magnification mode setting can be full screen magnification mode or target graphic representation magnification mode of a predetermined ratio and this can be done in a factory defined manner or a user defined manner and is stored in the proximity control parameter memory 3.

Figure 3:
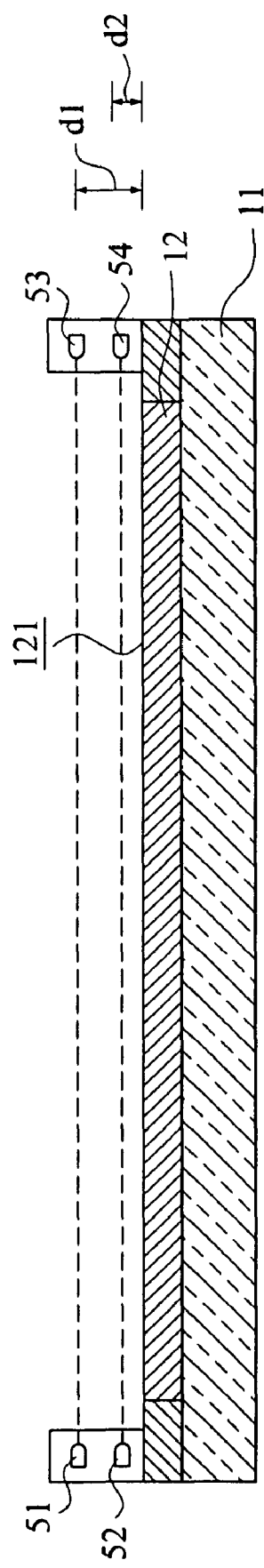
FIG. 3 shows a schematic illustration of an embodiment of an approaching object altitude detection unit included in the device of FIG. 1.

FIG. 3 shows a schematic illustration of a preferred embodiment of the approaching object altitude detection unit 5. The touch panel 12 of the touch display panel module 1 has first and second opposite side edges on the surface thereof. On the first side edge, a pair of signal transmission unit arrays 51, 52 are arranged, while on the second side edge, a pair of signal receiving unit arrays 53, 54 are arranged to correspond to the signal transmission unit arrays 51, 52. The signal transmission unit arrays 51, 52 can be arrays made up of infrared or laser beam or acoustic wave based signal transmitters, and the signal receiving unit arrays 53, 54 can be arrays of signal receivers that are of the type corresponding to the transmitters of the signal transmission unit arrays 51, 52.

The signal transmission unit array 51 is set corresponding to the signal receiving unit array 53 and they are spaced from a touch surface 121 of the touch panel 12 by the first predefined approaching altitude "d1", whereby they can detect if an approaching object 6, which can be for example a touch stylus or a user's finger tip, is getting close enough to reach the first approaching altitude "d1". The signal transmission unit array 52 is set corresponding to the signal receiving unit array 54 and they are spaced from the touch surface 121 of the touch panel 12 by the second predefined approaching altitude "d2", whereby they can detect if the approaching object 6 reach the second approaching altitude "d2".

Besides using what is illustrated in FIG. 3 to detect the approaching altitude of an approaching object, other ways can be adapted instead in detecting the approaching of an object or an article. For example, in case that the touch panel consists of a surface acoustic wave touch panel, the touch panel can detect an object approaching a surface of the touch panel and can further determine the distance that the approaching object is at with respect to the surface of the touch panel in accordance with the execution of programs on the basis of variation of acoustic wave diagram. In addition, it is also possible to estimate the distance that an objects is approaching the surface of the touch panel in accordance with variation of electric field.

The approaching object altitude detection unit 5 can also adapt signal transceivers or image sensors that do not operate in pair or use a capacitive panel with adjusted sensitivity of sensing capacitance coupling to detect the altitude or distance of an approaching object. The capacitive panel can be properly set by adjusting the sensitivity of sensing capacitance coupling to vary a threshold distance for detection of the approaching-object; and when the approaching object reaches the threshold distance, a given ratio of magnification is effected. Thus, the given ratio of magnification, which is often predefined in the factory, can be adjusted by varying the threshold distance.

Further, the number of paired signal transmitters/receivers included in the approaching object altitude detection unit 5 can be increased to provide more individual approaching altitudes that can be detected and thus, more stages of response can be realized, such as differences between approaching altitudes or responding operations. Therefore, dynamic magnification with magnification ratio varying in for example step-like fashion or linear fashion or continuous fashion is realized.

Figure 4:
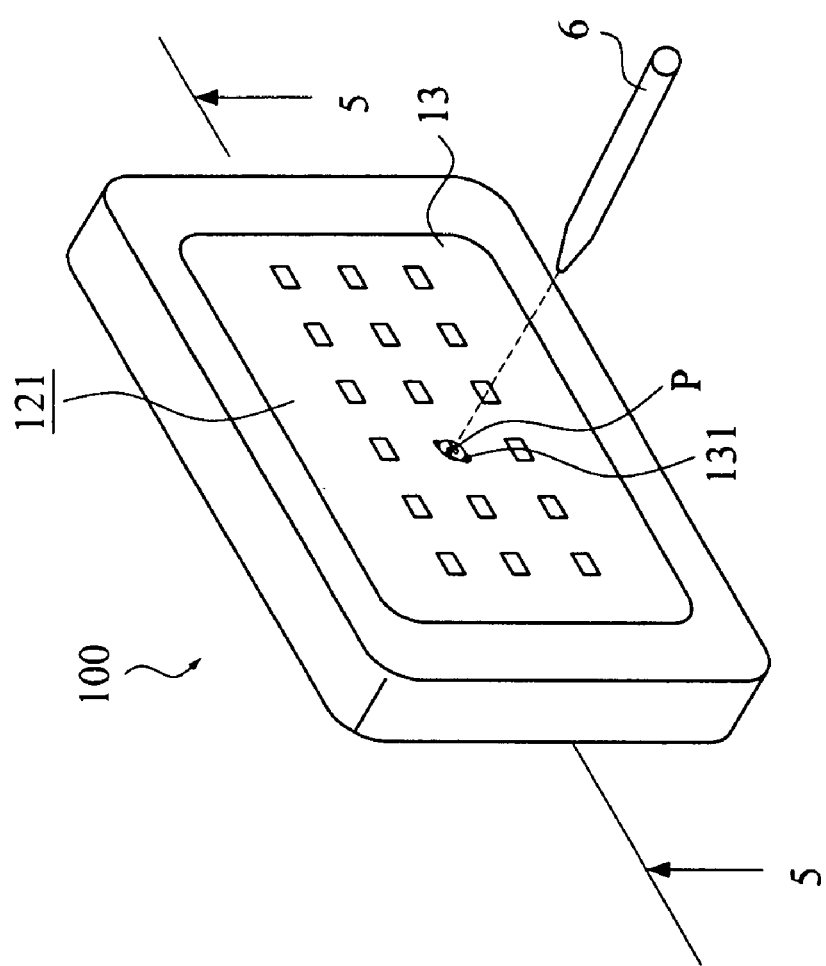
FIG. 4 is a perspective view illustrating an object approaching a touch panel of a touch display panel module of the device but at a sufficient far distance.
Figure 5:
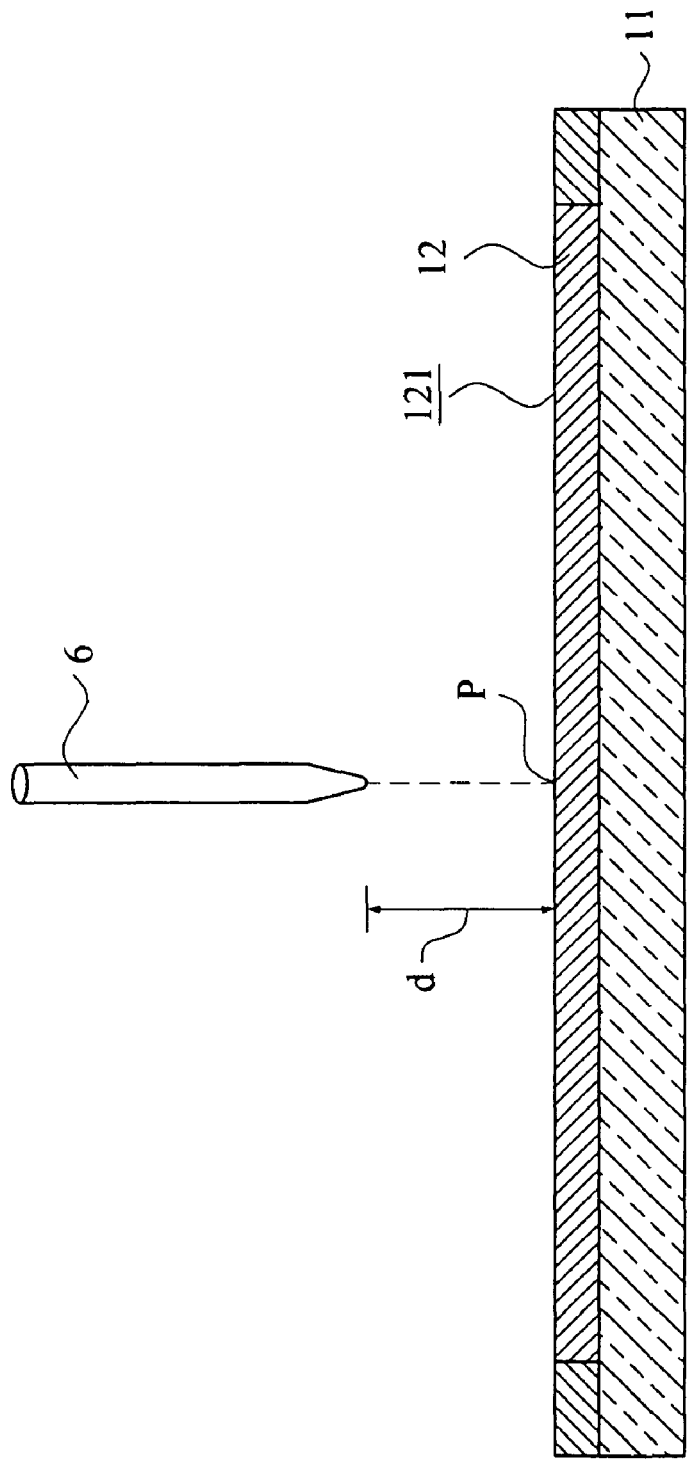
FIG. 5 is a cross-sectional view taken along line 5-5 of FIG. 4.
Figure 6:
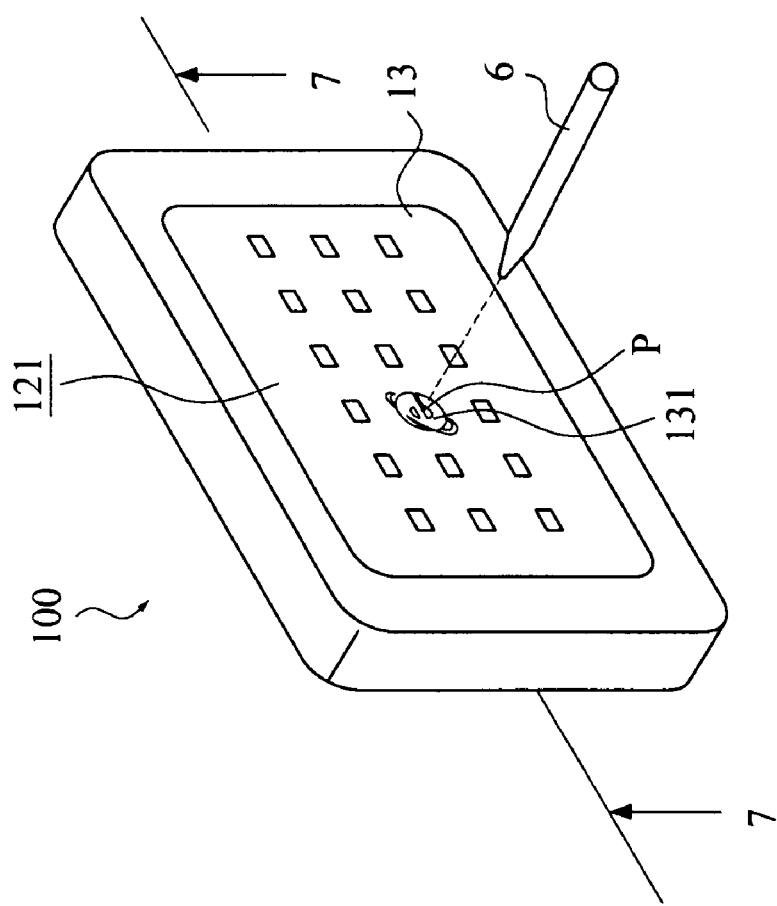
FIG. 6 is a perspective view illustrating the object approaching the touch panel of the touch display panel module and reaching an approaching altitude "d1" with respect to a touch surface of the touch panel.
Figure 7:
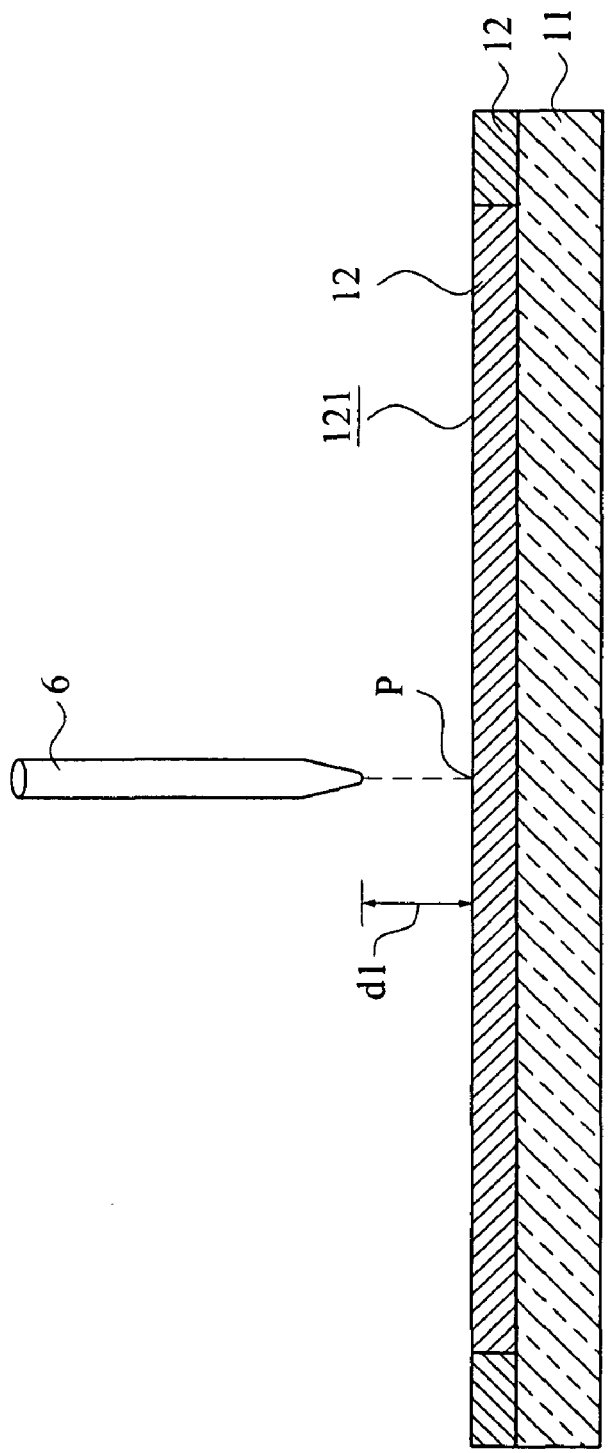
FIG. 7 is a cross-sectional view taken along line 7-7 of FIG. 6.
Figure 8:
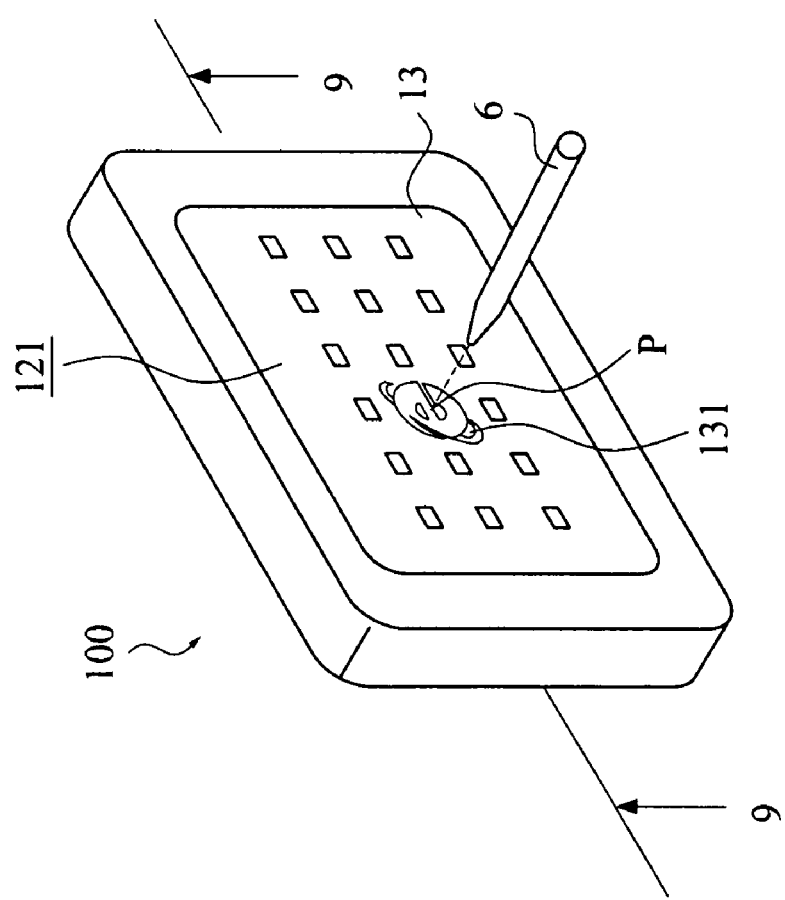
FIG. 8 is a perspective view illustrating the object approaching the touch panel of the touch display panel module and reaching the approaching altitude "d2" with respect to the touch surface of the touch panel.
Figure 9:
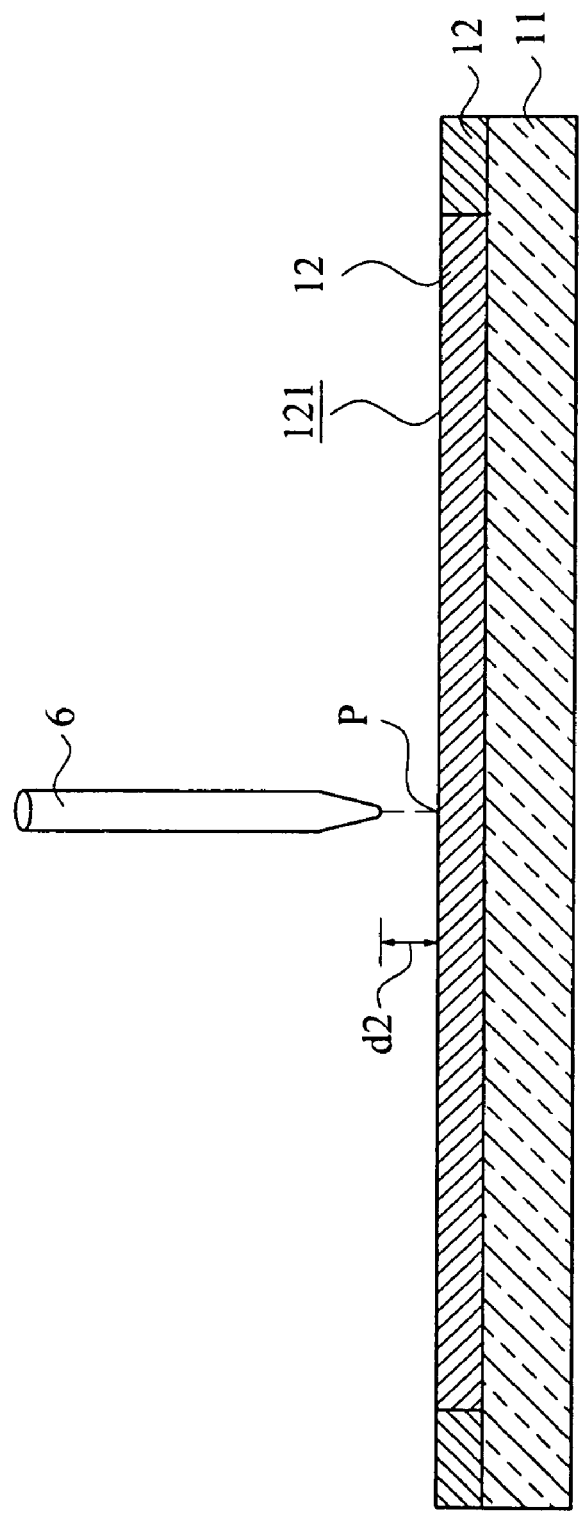
FIG. 9 is a cross-sectional view taken along line 9-9 of FIG. 8.

FIG. 4 is a perspective view illustrating an object 6 approaching the touch panel 12 of the touch display panel module 1 but at a sufficient far distance and FIG. 5 is a cross-sectional view taken along line 5-5 of FIG. 4. FIG. 6 is a perspective view illustrating an object 6 approaching the touch panel 12 of the touch display panel module 1 and reaching the altitude "d1" with respect to the touch surface of the touch panel 12 and FIG. 7 is a cross-sectional view taken along line 7-7 of FIG. 6. FIG. 8 is a perspective view illustrating an object 6 approaching the touch panel 12 of the touch display panel module 1 and reaching the altitude "d2" with respect to the touch surface of the touch panel 12 and FIG. 9 is a cross-sectional view taken along line 9-9 of FIG. 8.

Figure 10:
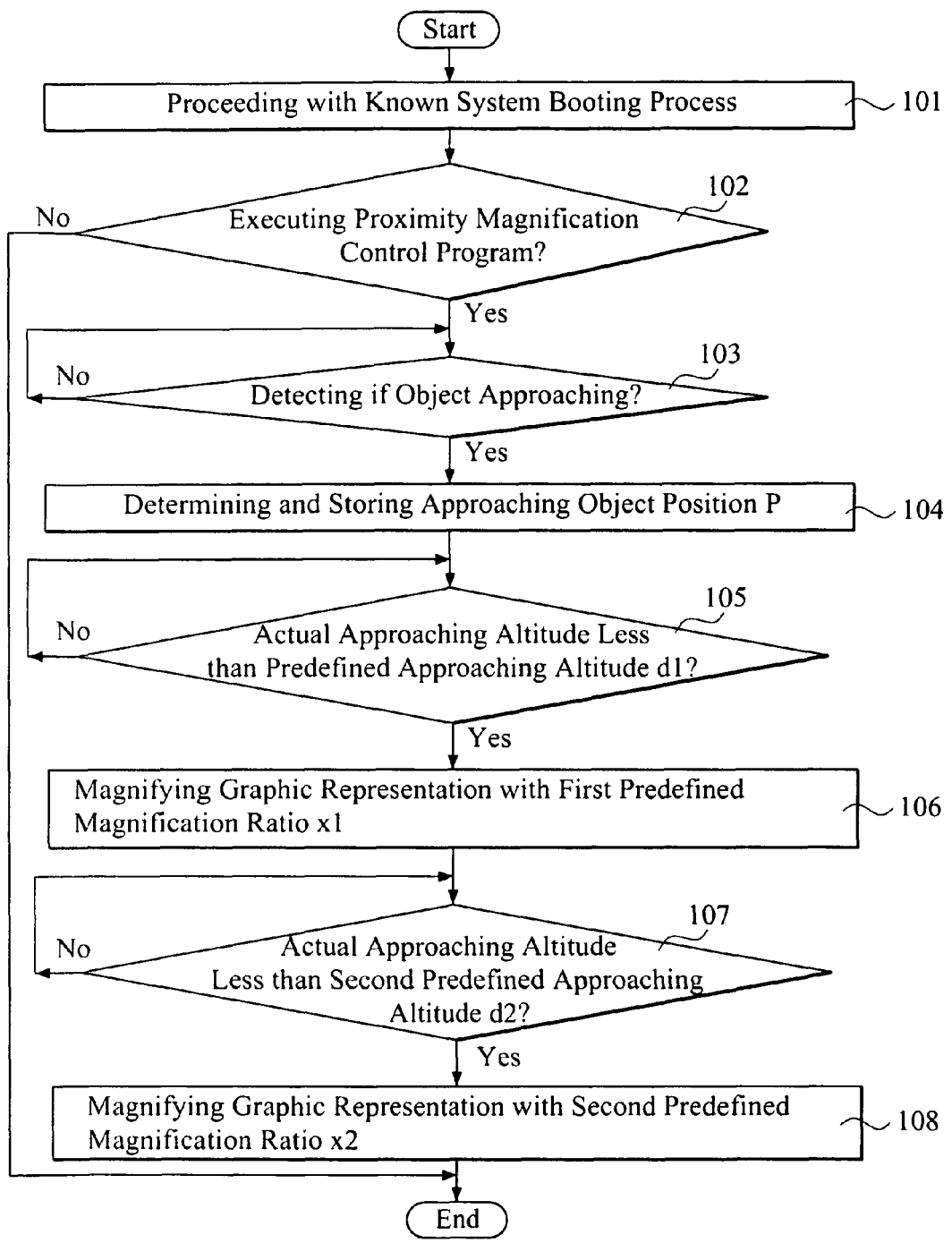
FIG. 10 shows a flow chart of a method for magnifying and displaying local image of touch display device by detecting approaching objecting in accordance with a first embodiment of the present invention.

FIG. 10 shows a flow chart of a method for magnifying and displaying local image of touch display device by detecting approaching object in accordance with a first embodiment of the present invention, which will be explain hereinafter with reference to FIGS. 1-9.

Firstly, the touch display device 100 proceeds with a known system booting process (step 101), including loading of operation system, initialization of system, setting of system, and loading of control program. A user then determine if to execute the proximity magnification control program to magnify and display a local image (step 102). If yes, then the proximity magnification control program is started to detect if an object 6 approaching the effective touch zone 13 of the touch panel 12 (step 103).

When the object 6 approaching the effective touch zone 13 of the touch panel 12 is detected, the program of the present invention determines and stores the approaching object position "P" of the object 6 located on the effective touch zone 13 of the touch panel 12 (step 104), and further detects if the approaching altitude of the object 6 with respect to the surface of the effective touch zone 13 of the touch panel 12 corresponds to the value of "d1". The approaching object position "P" is associated with at least one graphic representation 131 displayed on the display panel 11.

As shown in FIGS. 6 and 7, when the actual approaching altitude "d" of the object 6 with respect to the surface of the touch panel 12 is less than the predefined approaching altitude "d1" (step 105) and the situation maintains for a given period of time, the microprocessor 2 takes the position "P" of the object 6 as a reference point, and based on the image magnification mode setting "M" and the image magnification area setting "W", the microprocessor 2 magnifies and displays the graphic representation 131 that is located in a local area of the display panel 11 corresponding to the approaching object position "P" with the first predefined magnification ratio "x1" (step 106).

When the object 6 is displaced along the surface of the touch panel 12, meaning the approaching object position "P" of the approaching object 6 in the effective touch zone 13 of the touch panel 12 changes, the current position of the approaching object 6 will be determined again, whereby a visual pattern that dynamic displaying and magnification of the local image can be shown with the movement of the approaching object.

As shown in FIGS. 8 and 9, when the object 6 further approaches the surface of the touch panel 12 to such an extent that the actual approaching altitude "d" of the approaching object 6 with respect to the surface of the touch panel 12 is less than the second predefined approaching altitude "d2" (step 107) and such a situation maintains for a given period of time, the microprocessor 2 takes the position "P" of the object 6 as a reference point, and based on the image magnification mode setting "M" and the image magnification area setting "W", the microprocessor 2 magnifies and displays the graphic representation 131 that is located in a local area of the display panel 11 corresponding to the approaching object position "P" with the second predefined magnification ratio "x2" (step 108).

In practical applications, the target graphic representation 131 to which the approaching object position "P" points within the effective touch zone 13 of the touch panel 12 can be for example an icon associated with one of the system control items in the computer operation system or an executable application program. When an approaching object approaches the zone, a magnified image of the icon is shown up. The target graphic representation can alternatively be a locally displayed pattern or text on the touch display device, whereby when the approaching object approaches the zone, an enlarged image of the locally displayed pattern or text is shown.

FIG. 11 shows another example of the predefined approaching altitude vs operation table, which is referred to as TAB1a for distinction, wherein the second approaching altitude "d2" of the predefined approaching altitude vs operation table TAB1 shown in FIG. 2A is set to zero, and corresponding to an enlargement or magnification operation having a magnification ratio of the second predefined magnification "x2", such as enlarging the target graphic representation by three times.

Figure 12:
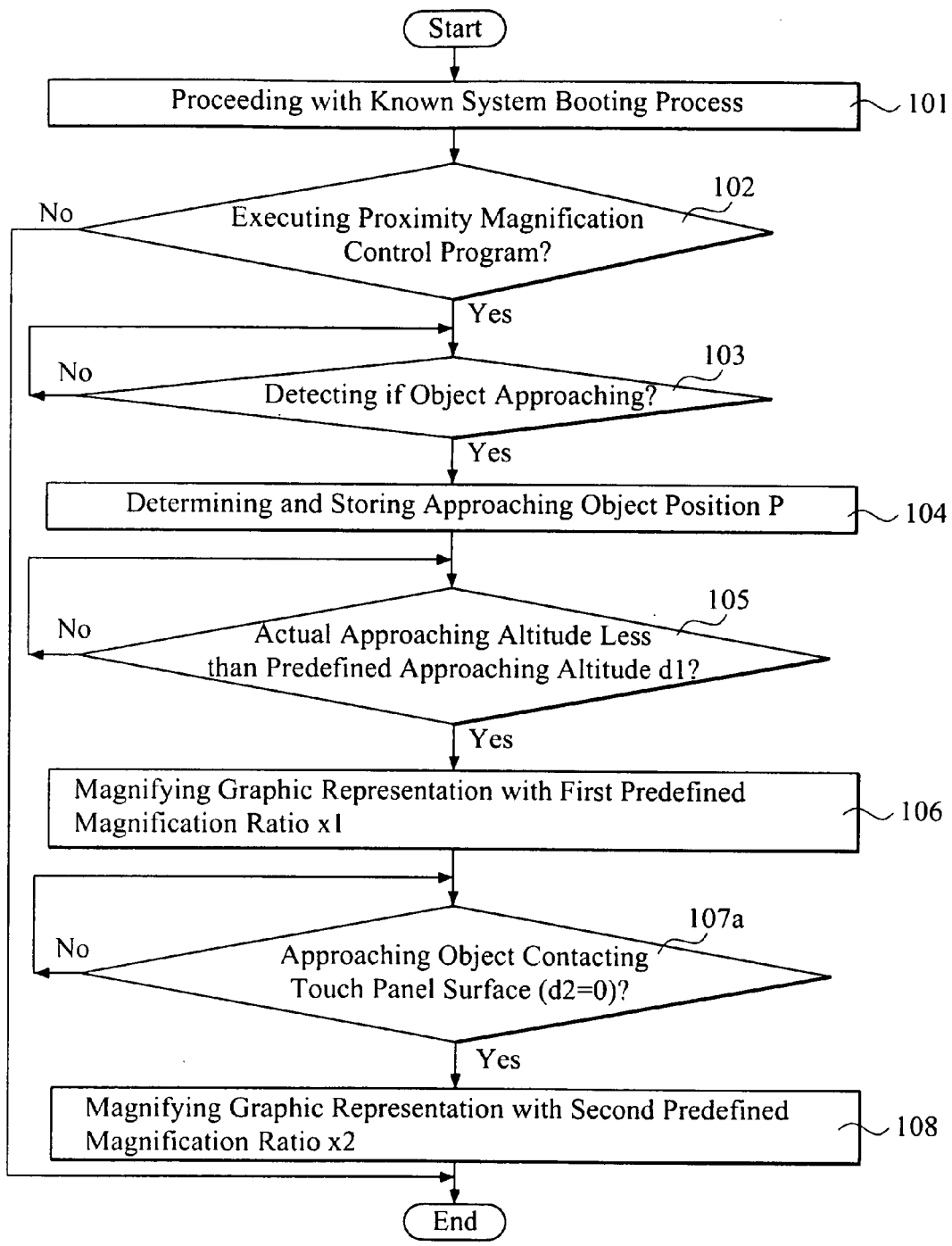
FIG. 12 shows a flow chart of a method for magnifying and displaying local image of touch display device by detecting approaching objecting in accordance with a second embodiment of the present invention.

FIG. 12 shows a flow chart of a method for magnifying and displaying local image of touch display device by detecting approaching objecting in accordance with a second embodiment of the present invention, of which most steps are identical to the flow chart of the method in accordance with the embodiment shown in FIG. 10; and the identical steps are indicated with the same reference numerals.

Figure 13:
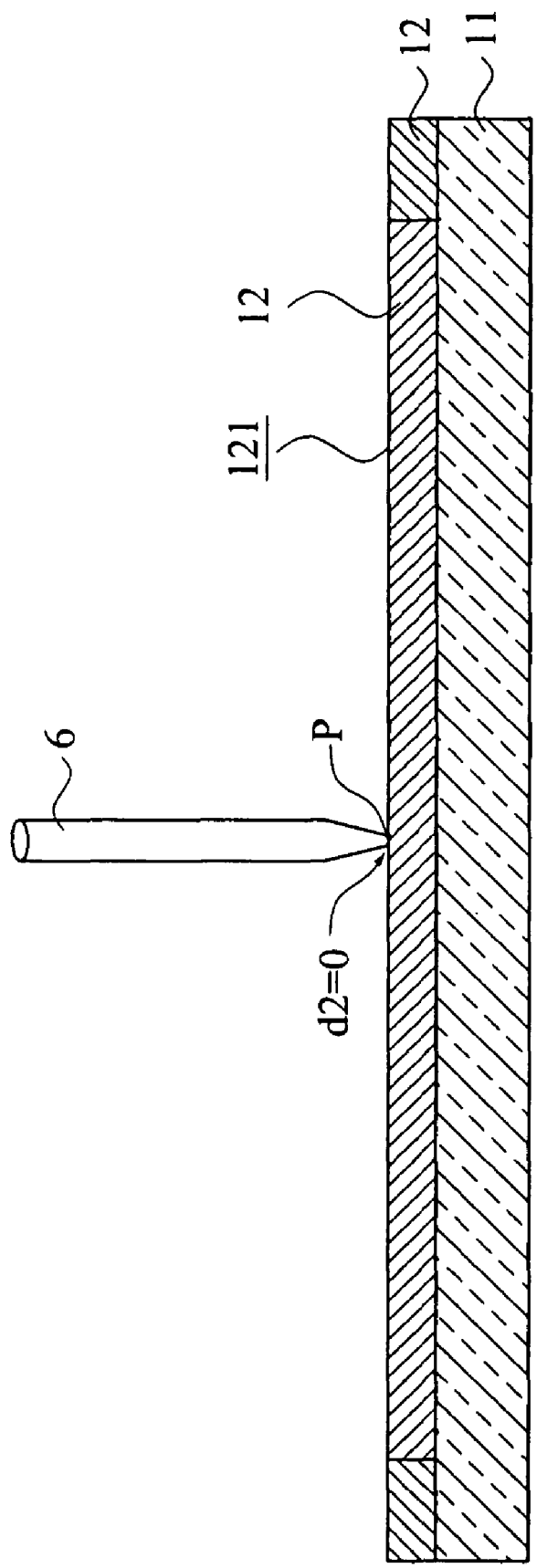
FIG. 13 is a schematic cross-sectional view illustrating when an approaching object is in contact with the touch panel of the touch display device.

In step 107 of the method illustrated in FIG. 10, the actual approaching altitude "d" of the approaching object 6 with respect to the surface of the touch panel 12 is determined to be less than the second predefined approaching altitude "d2" or not. However, in the method illustrated in FIG. 12, a step 107a replaces the step 107 of FIG. 10 and in the step 107a, it checks if the approaching object 6 is in contact with the surface of the touch panel 12, namely the second predefined approaching altitude "d2" being set to zero, as best seen in FIG. 13. And then, in step 108 of the method of FIG. 12, similar to that of FIG. 10, the position "P" of the approaching object 6 is taken as a reference point, and the image magnification mode setting "M" and the image magnification area setting "W" are based to carry out magnification of a target graphic representation with the second predefined magnification ratio "x2".

FIG. 14 shows a further example of the predefined approaching altitude vs operation table, which is referred to as TAB1b for distinction, wherein the operation of magnification corresponding to the second approaching altitude "d2" set in the predefined approaching altitude vs operation table TAB1 shown in FIG. 2A is now replaced by execution of an executable object that is associated with the target graphic representation displayed on the touch display device.

Figure 15:
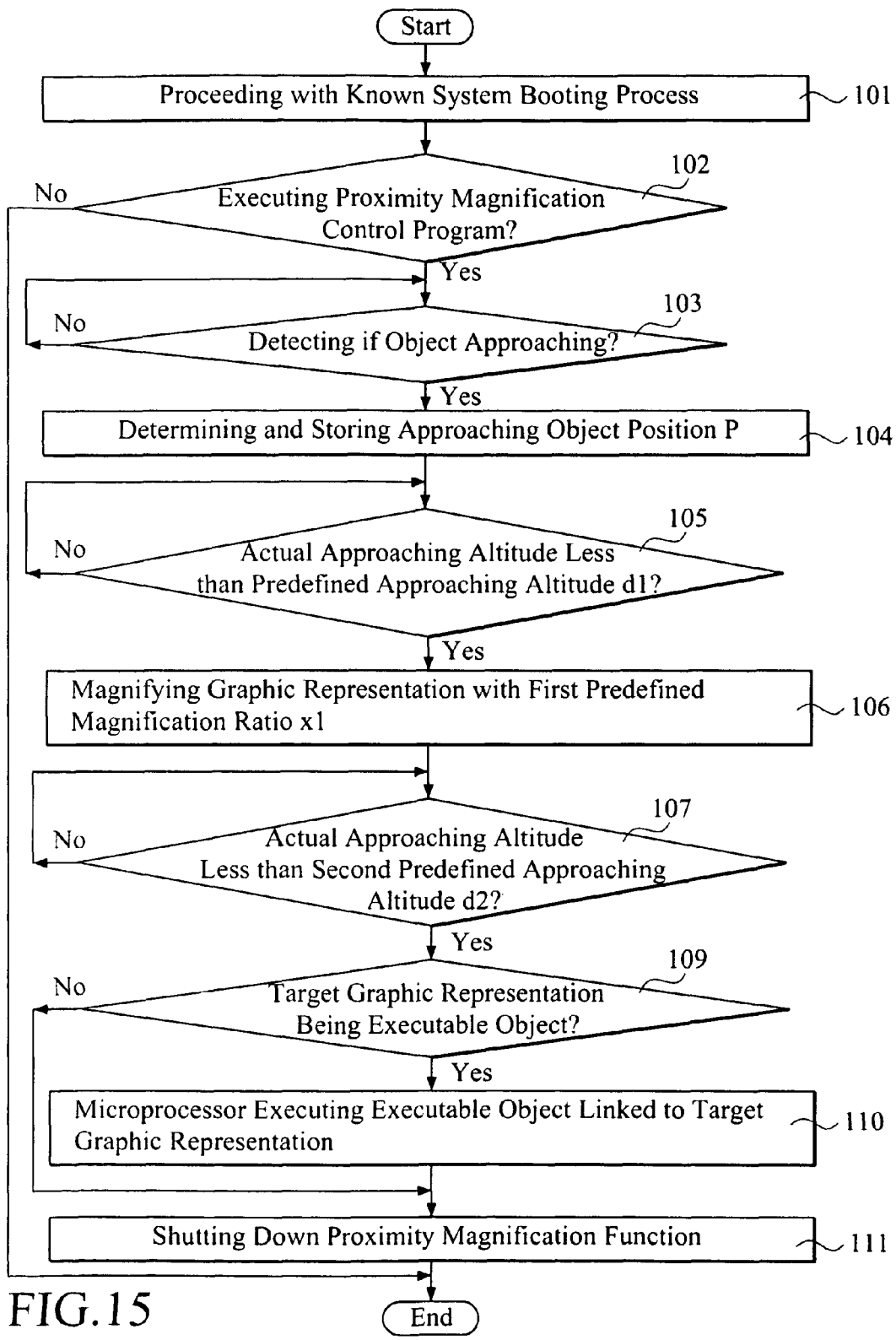
FIG. 15 shows a flow chart of a method for magnifying and displaying local image of touch display device by detecting approaching objecting in accordance with a third embodiment of the present invention.

FIG. 15 shows a flow chart of a method for magnifying and displaying local image of touch display device by detecting approaching objecting in accordance with a third embodiment of the present invention, of which most steps are identical to the flow chart of the method in accordance with the embodiment shown in FIG. 10; and the identical steps are indicated with the same reference numerals.

After step 107 of the method illustrated in FIG. 10, a new step, step 109, that determines if the target graphic representation the display panel corresponding to the approaching object position is an executable object is added. And if it is, then in step 110, the microprocessor executes the executable object that is linked to the target graphic representation and effects magnification of the target graphic representation based on the reference point set by the approaching object position is shut down (step 111).

FIG. 16 shows yet a further example of the predefined approaching altitude vs operation table, which is referred to as TAB1c for distinction, wherein the second predefined approaching altitude "d2" of the predefined approaching altitude vs operation table TAB1b shown in FIG. 14 is set to zero, and the operation corresponding to the second predefined approaching altitude "d2" remains execution of an executable object that is associated with the target graphic representation displayed on the touch display device and approached by the approaching object.

Figure 17:
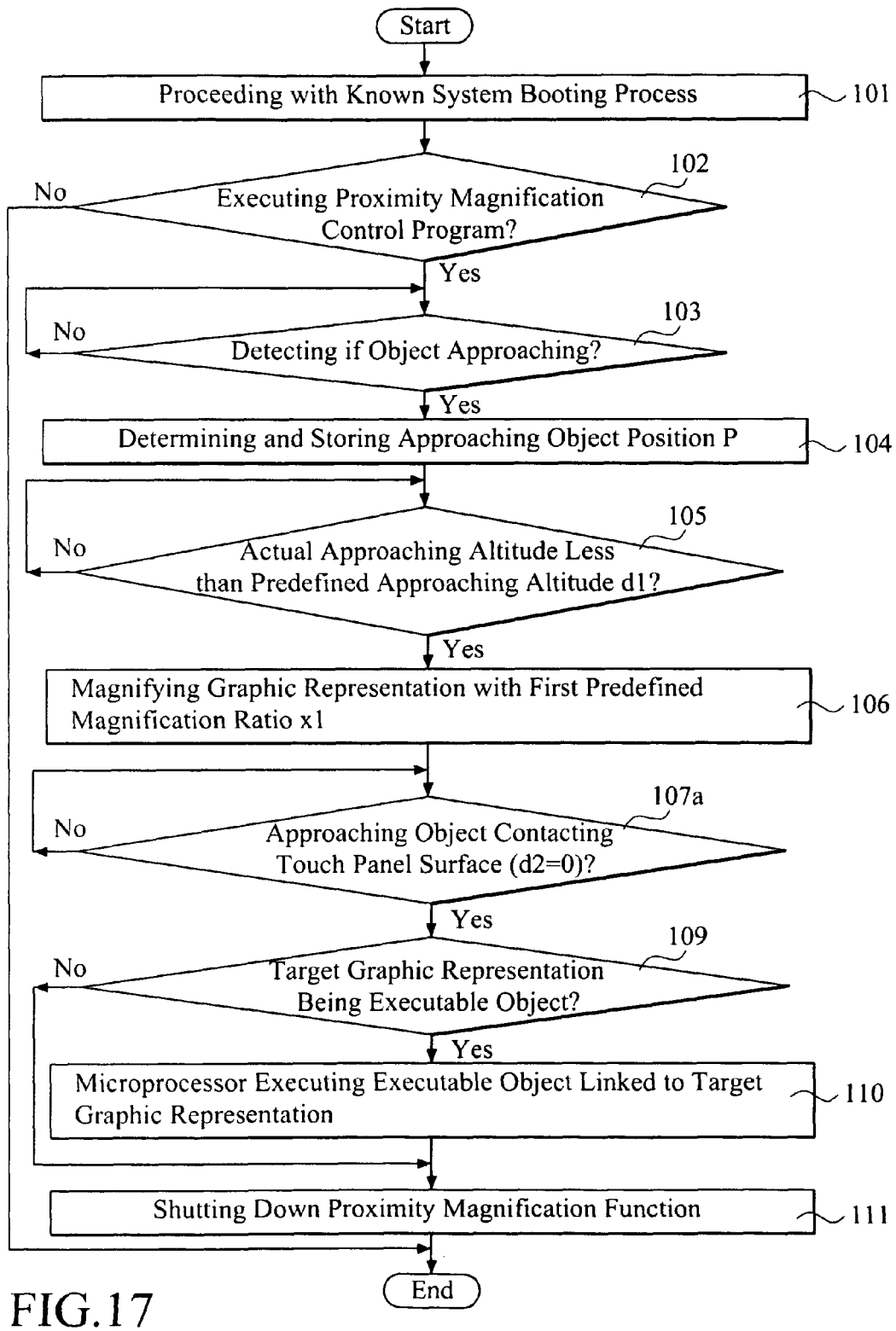
FIG. 17 shows a flow chart of a method for magnifying and displaying local image of touch display device by detecting approaching objecting in accordance with a fourth embodiment of the present invention.

FIG. 17 shows a flow chart of a method for magnifying and displaying local image of touch display device by detecting approaching objecting in accordance with a fourth embodiment of the present invention, of which most steps are identical to the flow chart of the method in accordance with the embodiment shown in FIG. 15; and the identical steps are indicated with the same reference numerals.

In the method illustrated in FIG. 15, step 107 checks if the actual approaching altitude of an approaching object with respect to the surface of the touch panel is be less than the second predefined approaching altitude; and then in step 108, it is determined if the graphic representation is an executable object. However, in the method illustrated in FIG. 17, a step 107a replaces the step 107 of FIG. 15 and in the step 107a, it checks if the approaching object is in contact with the surface of the touch panel, namely the second predefined approaching altitude "d2" being set to zero; and then, step 109 determines if the target graphic representation is executable.

Although the present invention has been described with reference to the preferred embodiments thereof, as well as the best mode for carrying out the present invention, it is apparent to those skilled in the art that a variety of modifications and changes may be made without departing from the scope of the present invention which is intended to be defined by the appended claims.

What is claimed is:

1. A method for magnifying and displaying a local image displayed on a touch display device, the touch display device comprising a display panel and a touch panel integrated on the display panel, the touch panel having a touch surface defining an effective touch zone, comprising the following steps:
   (a) detecting if an approaching object is approaching the touch surface in the effective touch zone;
   (b) detecting an approaching object position in the effective touch zone of the touch panel where the approaching object heads for, the approaching object position being associated with at least one target graphic representation displayed on the display panel;
   (c) determining an approaching altitude of the approaching object on the approaching object position in the effective touch zone of the touch panel with respect to the touch surface of the touch panel;
   (d) magnifying and displaying the target graphic representation associated with the approaching object position based on a first predefined magnification and a predefined image magnification mode setting in relation with a first predefined approaching altitude value when the approaching altitude of the approaching object with respect to the touch surface of the touch panel is detected to be less than the first predefined approaching altitude value; and
   (e) detecting and determining if the approaching altitude of the approaching object with respect to the touch surface of the touch panel is less than a second predefined approaching altitude value, wherein the second predefined approaching altitude value is less than the first predefined approaching altitude value but greater than zero;
   (f) determining if the target graphic representation associated with the approaching object position is an executable object; and
   (g) executing the executable object of the target graphic representation when the approaching altitude of the approaching object with respect to the touch surface of the touch panel is less than the second predefined approaching altitude value and before the approaching object is in contact with the touch surface of the touch panel.

2. The method as claimed in claim 1 further comprising, before step (a), a step of determining if to magnify and display the local image.

3. The method as claimed in claim 1 further comprising magnifying and displaying the target graphic representation based on a second predefined magnification in relation to the second predefined approaching altitude value when the approaching altitude of the approaching object with respect to the touch surface of the touch panel is less than the second predefined approaching altitude value.

4. The method as claimed in claim 1 further comprising, after step (g), the following steps:
   (h) detecting if the approaching object is in contact with the touch surface of the touch panel; and
   (i) magnifying and displaying the target graphic representation based on a third predefined magnification when the approaching object is in contact with the touch surface of the touch panel.

5. The method as claimed in claim 1, wherein the target graphic representation is linked to an executable program or a system program.

6. The method as claimed in claim 1, wherein the target graphic representation comprises an executable control key.

7. The method as claimed in claim 1, wherein the target graphic representation comprises one of an alphabetic key, a numeric key, and a symbol key.

8. The method as claimed in claim 1, wherein the target graphic representation comprises one of a static image and a dynamic image.

9. The method as claimed in claim 1, wherein the image magnification mode setting is local area magnification, in which the approaching object position is taken as a center and a local area around the center defined by the approaching object position is magnified in accordance with a predefined magnification operation.

10. The method as claimed in claim 9, wherein the image magnification mode setting magnifies a local area that is one of a circular area, a rectangular area and a predefined contour area surrounding the approaching object position.

11. The method as claimed in claim 1, wherein the image magnification mode setting is full screen magnification.

12. The method as claimed in claim 1, wherein the image magnification mode setting comprises the operation of magnifying the target graphic representation by the first predefined magnification.

13. The method as claimed in claim 1, wherein the first predefined magnification is a factory defined magnification.

14. The method as claimed in claim 1, wherein the first predefined magnification is a user defined magnification.

15. A system for magnifying and displaying a local image displayed on a touch display device, the touch display device comprising a display panel and a touch panel integrated on the display panel, the touch panel having a touch surface defining an effective touch zone, comprising:
   a microprocessor connected to the touch panel and the display panel via a touch panel interface and a display panel interface respectively;
   an approaching object altitude detection unit connected to the microprocessor and detecting an approaching altitude of an approaching object with respect to the touch surface of the touch panel to provide a detected altitude value to the microprocessor;
   a program memory connected to the microprocessor and storing a proximity magnification control program; and
   a proximity control parameter memory connected to the microprocessor and storing at least a first predefined approaching altitude and a corresponding magnification ratio, and a second predefined approaching altitude, wherein the second predefined approaching altitude is less than the first approaching altitude but greater than zero;
   configured such that when an approaching object is approaching the touch surface in the effective touch zone of the touch panel, the approaching object altitude detection unit detects when the detected value of the approaching altitude of the approaching object with respect to the touch surface of the touch panel is less than the first predefined approaching altitude and when the detected value of the approaching altitude of the approaching object with respect to the touch surface of the touch panel less then the second predefined approaching altitude, and the microprocessor executes the proximity magnification control program to magnify a target graphic representation displayed in a local area of the display panel corresponding to an approaching object position on the touch panel where the approaching object is heading for based on the magnification ratio corresponding to the first predefined approaching altitude with the approaching object position taken as a reference point when the detected value of the approaching altitude of the approaching object with respect to the touch surface of the touch panel is less than the first predefined approaching altitude; and the microprocessor determines when the target graphic representation associated with the approaching object position is an executable object and executes the executable object of the target graphic representation when the detected value of the approaching altitude of the approaching object with respect to the touch surface of the touch panel is less than the second predefined approaching altitude value and before the approaching object is in contact with the touch surface of the touch panel.

16. The system as claimed in claim 15, wherein the approaching object altitude detection unit comprises:
   a first signal transmission unit arrays arranged on a first side edge of the touch panel and spaced from the touch surface of the touch panel by a distance corresponding to the first predefined approaching altitude; and
   a first signal receiving unit arrays arranged on a second, opposite side edge of the touch panel and spaced from the touch panel by a distance corresponding to the first predefined approaching altitude;
   wherein the first signal transmission unit arrays and the first signal receiving unit arrays oppose each other to detect if the approaching object reaches the first predefined approaching altitude.

17. The system as claimed in claim 16, wherein the approaching object altitude detection unit further comprises:
   a second signal transmission unit arrays arranged on the first side edge of the touch panel and spaced from the touch surface of the touch panel by a distance corresponding to the second predefined approaching altitude; and
   a second signal receiving unit arrays arranged on a second, opposite side edge of the touch panel and spaced from the touch panel by a distance corresponding to the second predefined approaching altitude;
   wherein the second signal transmission unit arrays and the second signal receiving unit arrays oppose each other to detect if the approaching object reaches the second predefined approaching altitude.

18. The system as claimed in claim 15, wherein the proximity control parameter memory further contains at least one predefined magnification mode setting.

19. The system as claimed in claim 15, wherein the proximity control parameter memory further contains at least one predefined image magnification area setting.

20. The system as claimed in claim 15, wherein the proximity control parameter memory further contains at least one set of factory-defined proximity control parameters.

21. The system as claimed in claim 15, wherein the proximity control parameter memory further contains at least one set of user-defined proximity control parameters.

* * * * *